United States Patent [19]

Azumi et al.

[11] Patent Number: 4,868,666
[45] Date of Patent: Sep. 19, 1989

[54] AUTOMATIC FOCUSING APPARATUS HAVING AN AUTOMATIC OFFSET VOLTAGE REGULATING DEVICE

[75] Inventors: Takashi Azumi; Toshio Murakami, both of Yokohama, Japan

[73] Assignee: Hitachi, Ltd., Tokyo, Japan

[21] Appl. No.: 130,480

[22] Filed: Dec. 9, 1987

[30] Foreign Application Priority Data

Dec. 12, 1986 [JP]  Japan .............................. 61-294813

[51] Int. Cl.$^4$ ............................................. H04N 3/26
[52] U.S. Cl. .................................... 358/227; 354/402
[58] Field of Search .............. 358/225, 227, 228, 209; 350/563, 564; 352/139, 140; 354/400, 402, 403, 409, 407; 355/56

[56] References Cited

U.S. PATENT DOCUMENTS

| | | | |
|---|---|---|---|
| 4,320,417 | 3/1982 | Hanma | 358/227 |
| 4,531,158 | 7/1985 | Murakami | 358/227 |
| 4,611,244 | 9/1986 | Hanma | 358/227 |

Primary Examiner—Tommy P. Chin
Attorney, Agent, or Firm—Antonelli, Terry & Wands

[57] ABSTRACT

An automatic focusing apparatus for a video camera converts the quantity of reflected light reflected by an object into an electric signals by light receiving elements. The electric signals are detected and the detected signals are integrated by integrators once every fixed period. A decision is made on the basis of the respective outputs of the integrators whether or not the video camea is in focus. The detectors and the integrators have offset voltages, respectively. The outputs of the integrators are sampled and held and are compared with a reference voltage equal to a voltage for resetting the integrators. Signals representing the result of the comparison are fed back to the detectors or to the integrators to regulate the offset voltages of the detectors and the integrators.

24 Claims, 8 Drawing Sheets (A) RESET PULSE
(B) SAMPLE HOLD PULSE
(C) SYNCHRONOUS SIGNAL
(D) IRED SIGNAL
(E) Ach INTEGRATOR OUTPUT VOLTAGE
(F) Bch INTEGRATOR OUTPUT VOLTAGE

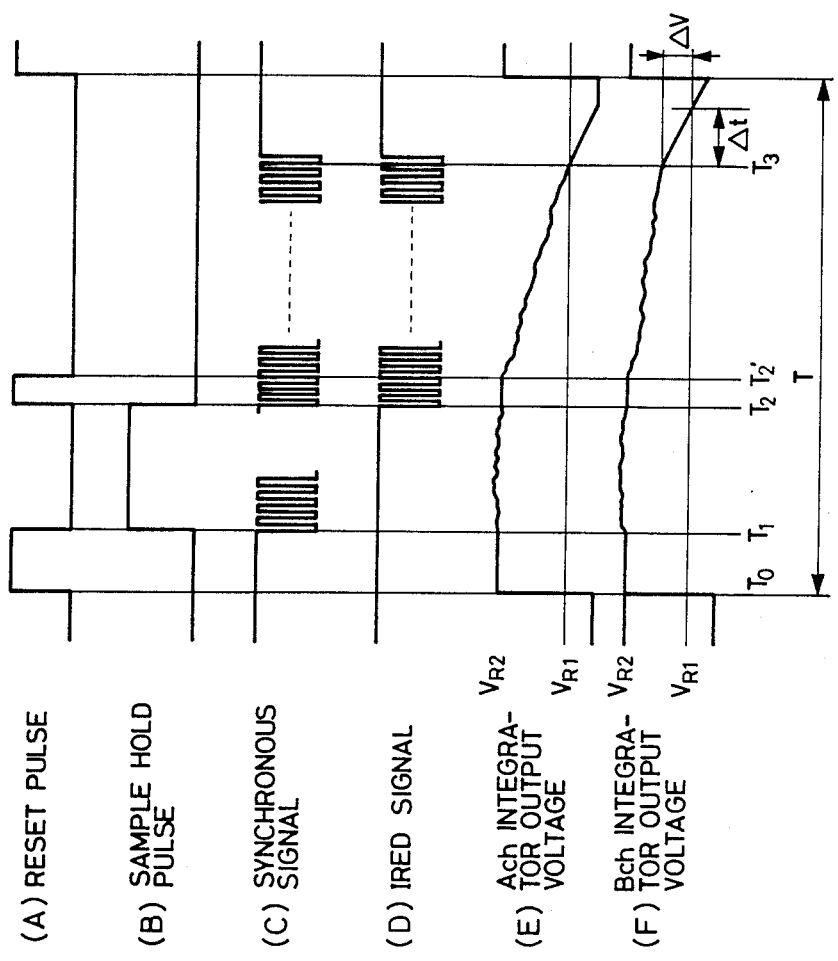

(A) RESET PULSE
(B) SAMPLE HOLD PULSE
(C) INTEGRATOR OUTPUT
(D) INTEGRATOR OUTPUT

AUTOMATIC FOCUSING APPARATUS HAVING AN AUTOMATIC OFFSET VOLTAGE REGULATING DEVICE

BACKGROUND OF THE INVENTION

The present invention relates to an automatic focusing apparatus for a video camera.

Conventional automatic focusing apparatus are classified roughly into two types.

Automatic focusing apparatus of a first type modulate the intensity of a beam of infrared rays at a predetermined frequency, project the modulated beam of infrared rays on an object, and detect a beam of infrared rays reflected by the object to determine the state of focus. Such automatic focusing apparatus are disclosed in U.S. Pat. No. 4,251,145 and Japanese Pat. Provisional Publication No. 57-20708. Such a known automatic focusing apparatus modulates the intensity of a beam of infrared rays at a predetermined frequency, projects the modulated beam of infrared rays on an object, converts a beam of infrared rays reflected by the object into an electric signal by a light receiving element, detects the electric signal by a synchronous detector, integrates the detected electric signal once every predetermined time interval to obtain a focus signal, and compares the focus signal with a reference voltage to decide the state of focus. In such an automatic focusing system, the magnitude of the light receiving element is very small and, sometimes, the offset voltages of the synchronous detector and the integrator are greater than the output of the light receiving element when the subject distance is great. In such a case, an erroneous decision regarding the state of focus results.

The conventional automatic focusing apparatus includes an offset voltage regulating means to reduce the offset voltage of the synchronous detector or the integrator to zero when no light is falling on the light receiving element. However, the offset voltages of the synchronous detector and the integrator vary depending on the ambient temperature and hence the associated circuits must be designed strictly so as to eliminate the influence of temperature variation on the automatic focusing operation.

An automatic focusing apparatus of the other type brings an object into focus by regulating the position of the taking lens so that the high-frequency component of a video signal provided by the video camera is increased to a maximum. Japanese Pat. Provisional Publication (Kokai) No. 58-48576 discloses such an automatic focusing apparatus. In such an automatic focusing system, the high-frequency component is subjected to full-wave detection and the detected signal is integrated once every fixed period of time to obtain a focus signal. In the automatic focusing apparatus of this type continuous regulation to reduce the offset voltage of the integrating circuit to zero is necessary.

Inventions relating to the present invention are disclosed in U.S. Pat. Appln. No. 858,792 (Title: "Automatic Focusing Apparatus", Filing date: May, 1986, Inventors: Hironobu Sato, Takesuke Maruyama, Takashi Azumi), U.S. Pat. Nos. 4,611,244, 4,320,417 and 4,531,158, and U.S. Pat. No. 4,740,676 (Title: Focusing Apparatus", Filing date: Sept. 19, 1987, Inventors: Kenji Sano, Hironobu Sato, Takesuke Maruyama, Takanori Hisada, Takashi Azumi).

SUMMARY OF THE INVENTION

It is an object of the present invention to provide an automatic focusing apparatus capable of automatically regulating the offset voltages of the integrator and detector thereof and capable of eliminating the adverse influence of the offset voltages attributable to the variation of the ambient temperature.

It is another object of the present invention to provide an automatic focusing apparatus which projects a light beam on an object by a light projecting unit, receives the light reflected by the object and converts the light into an electric signal by a light receiving element, decides the state of focalization on the basis of the quantity of the electric signal provided by the light receiving element, and is capable of automatically regulating the offset voltage of the electric signal processing system to eliminate the adverse influence of the offset voltage attributable to the variation of the ambient temperature.

It is a further object of the present invention to provide an automatic focusing apparatus capable of deciding the state of focalization on the basis of the quantity of the high-frequency component of a video signal provided by a video camera and capable of automatically regulating the offset voltage of an integrator included therein.

In an automatic focusing apparatus according to the present invention, light reflected by an object falls on a light receiving element, and then the light receiving element generates an electric signal corresponding to the quantity of the incident light. A detector detects the electric signal, and then an integrator integrates the detected electric signal once every predetermined period of time. The output of the integrator is applied to a focus decision circuit to decide whether perfect focalization is achieved. The respective offset voltages of the detector and the integrator are regulated automatically by a sample-hold circuit, a comparator and a feedback circuit. The sample-hold circuit samples and holds the output signals of the integrator The signals sampled and held by the sample-hold circuit are compared with a reference signal (a signal equal to the output signal of the integrator provided when the integrator is reset), the output signal of the comparator is given to the feedback circuit, and then the feedback circuit gives a signal for reducing the difference between the reference signal and the signal sampled and held by the sample-hold circuit to zero to the detector or the integrator, and thereby the offset voltages of the detector and the integrator are regulated automatically.

BRIEF DESCRIPTION OF THE DRAWINGS

FIG. 4 is waveform chart of assistance in explaining another mode of operation of the automatic focusing apparatus of FIG. 1;

DESCRIPTION OF THE PREFERRED EMBODIMENTS

Prior to the description of the preferred embodiments of the present invention, the principle of the present invention will be described.

Figure 10:
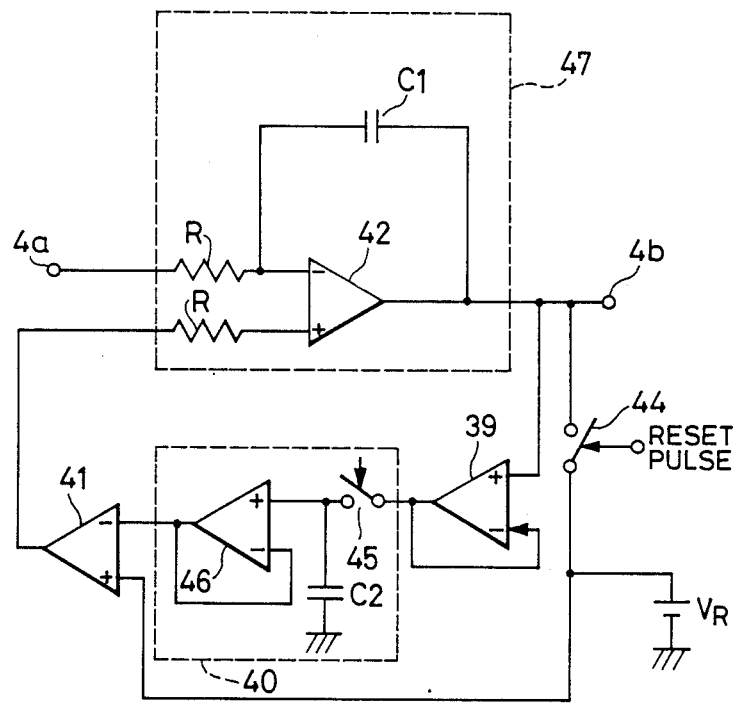
FIG. 10 is a circuit diagram of assistance in explaining the principle of the present invention.
Figure 11:
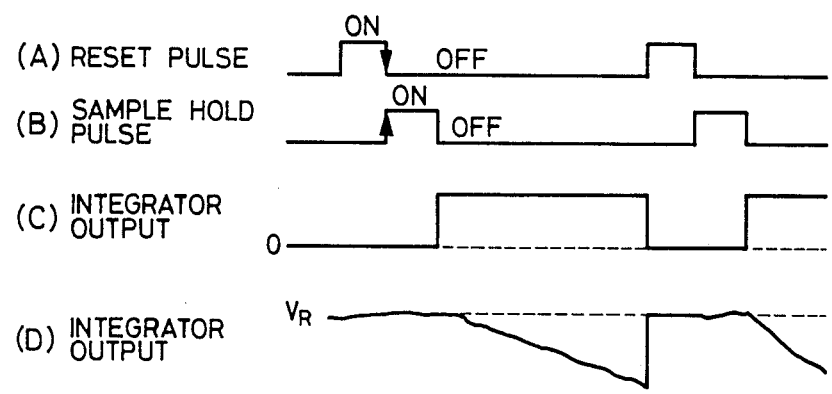
FIG. 11 is a waveform chart of assistance in explaining the principle of the present invention.

Referring to FIGS. 10 and 11, an integrator 47 is connected to a photoelectric signal input terminal 4a and an output terminal 4b. The integrator 47 comprises an amplifier 42 and a capacitor $C_1$. A feedback circuit is connected to the input terminal 4a and the output terminal 4b. The feedback circuit comprises an amplifier 39, a sample-hold circuit 40, a differential amplifier 41 and a reference voltage source VR. The sample-hold circuit 40 comprises an amplifier 46, a switch 45 and a capacitor $C_2$. A focus detecting signal, namely, a photoelectric signal, generated by a light receiving element, such as a photodiode, is applied to the focus detecting signal input terminal 4a.

When a switch 44 is closed by a reset pulse, the integrator 47 is reset and a reference voltage $V_R$ appears at the output terminal 4b. The switch 45 closes at the trailing edge of the reset pulse (a) (FIG. 11) to actuate the sample-hold circuit 40, and thereby a negative feedback loop of the integrator 47—the amplifier 39—the sample-hold circuit 40—a differential amplifier 41—the integrator 47 is formed. The output terminal 4b is connected through the sample-hold circuit 40 to the negative input terminal of the differential amplifier 41. The positive input terminal of the differential amplifier 41 is connected to the reference voltage source $V_R$ for resetting the integrator 47. Accordingly, a difference voltage corresponding to the difference between the reference voltage $V_R$ and the output C of the integrator 47 appears at the output terminal of the differential amplifier 41. The difference voltage is applied to the positive input terminal (a DC voltage regulating terminal) of the integrator 47. The integrator integrates the difference voltage and the offset voltage thereof. When the offset voltage converted into the input voltage of the integrator 47 and the difference voltage are the same and are opposite to each other in polarity, the output of the integrator is equal to the reference voltage $V_R$. Since the the capacitor $C_2$ retains the difference voltage after a sample-hold pulse (hereinafter referred to as "SH pulse") (b) (FIG. 11) has broken, the output of the integrator 47 remains at the reference voltage $V_R$ when the input voltage (c) of the integrator 47 is zero as indicated by a broken line in FIG. 11. When a positive voltage (c) is applied to the integrator 47 as indicated by a solid line in FIG. 11, the output (d) of the integrator 47 varies in one direction in proportion to the input.

Consequently, the output (d) of the integrator 47 is not dominated by the offset voltage of the integrator 47 and is dependent only on the input signal and the reset time Accordingly, the offset voltage of the integrator need not be regulated. Similarly, the variation of the offset voltage due to temperature variation can be absorbed in the same manner.

The present invention will be described hereinafter as applied to an automatic focusing apparatus which projects an infrared beam on an object and detects the reflected infrared beam for automatic focusing.

Figure 1:
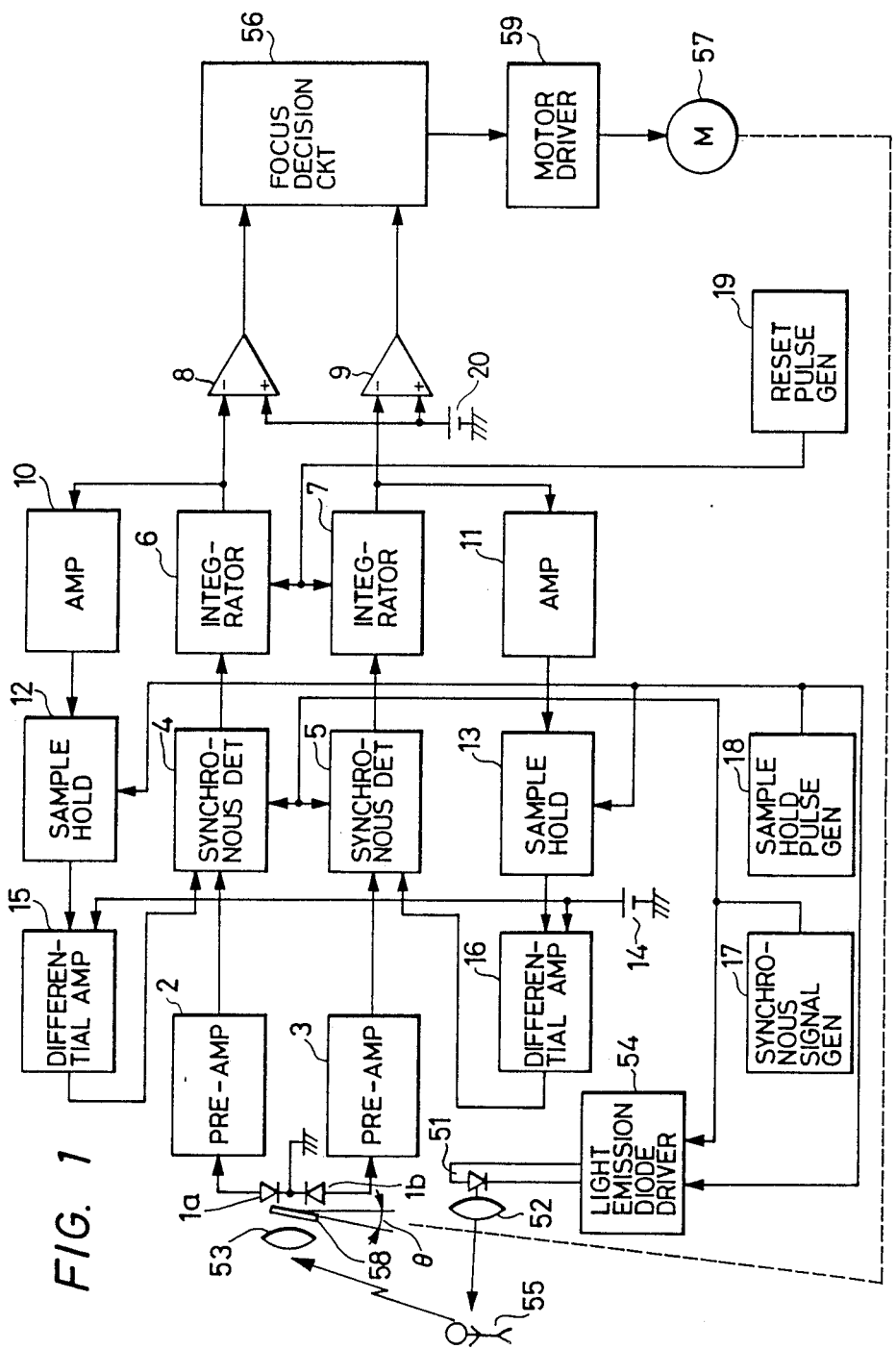
FIG. 1 is a block diagram of an automatic focusing apparatus, in a preferred embodiment, according to the present invention.

Referring to FIG. 1, an automatic focusing apparatus, in a first embodiment, according to the present invention comprises two light receiving elements (hereinafter referred to as "PDs") 1a and 1b, preamplifiers 2 and 3 respectively for the current-voltage conversion of the output photoelectric currents of the PDs 1a and 1b, synchronous detectors 4 and 5, integrators 6 and 7 respectively for integrating the outputs of the synchronous detectors 4 and 5 with respect to time, comparators 8 and 9 respectively for detecting the levels of the outputs of the integrators 6 and 7, buffer amplifiers (hereinafter referred to simply as "amplifiers") 10 and 11 respectively for transmitting the outputs of the integrators 6 and 7, sample-hold circuits 12 and 13 respectively for sampling and holding the outputs of the amplifiers 10 and 11, a second reference voltage source 14 which provides a voltage $V_{R2}$ equal to the reset voltage of the integrators 6 and 7, differential amplifiers 15 and 16 respectively for amplifying the difference between the voltage $V_{R2}$ and the output of the sample-hold circuit 12 and the difference between the voltage $V_{R2}$ and the output of the sample-hold circuit 13, a synchronizing signal generator 17 which generates a synchronizing signal for driving the synchronous detectors 4 and 5, a SH pulse generator 18 which controls the sample-hold circuits 12 and 13, a reset pulse generator 19 which generates a reset pulse signal (A) for resetting the integrators 6 and 7, a first reference voltage source 20 which provides a voltage $V_{R1}$ for deciding the respective thresholds of the comparators 8 and 9, a focus decision circuit 56, a motor 57, a motor driver 59 for driving the motor 57, a light emission diode 51, a light emission diode driver 54, a projector lens 52, a receiver lens 53, and a transparent flat plate 59. Ordinarily, the light emission diode 51 is an infrared-ray emission diode Driving pulses are given intermittently to the light emission diode 51 to make the light emission diode 51 luminance intermittently The light emitted by the light emission diode 51 is condensed by the projector lens 52 and is projected on an object 55. The light reflected by the object 55 falls through the receiver lens 53 on the PDs 1a and 1b. Then, the PDs 1a and 1b generate focus detecting signals. The transparent flat plate 58 is interposed between the receiver lens 53, and the PDs 1a and 1b. A ratio in incident light quantity between the PDs 1a and 1b varies according to the inclination 8 of the transparent flat plate 58. The transparent flat plate 58 is interlocked with the range ring of a video camera, not shown, so that the inclination θ thereof varies according to the angular phase of the range ring. When the lens system of the video camera is brought into focus, the quantity of incident light on the PD 1a and that of incident light on the PD 1b are the same. The focus decision circuit 56 gives a control signal to the motor driver 59 to make the motor 57 drive the transparent flat plate 58 and the range ring so that the focus detecting signals respectively provided by the PDs 1a and 1b coincide with each other. The light emission diode 51 is driven in synchronism with the output signal of the synchronizing signal generator 17.

Figure 2:
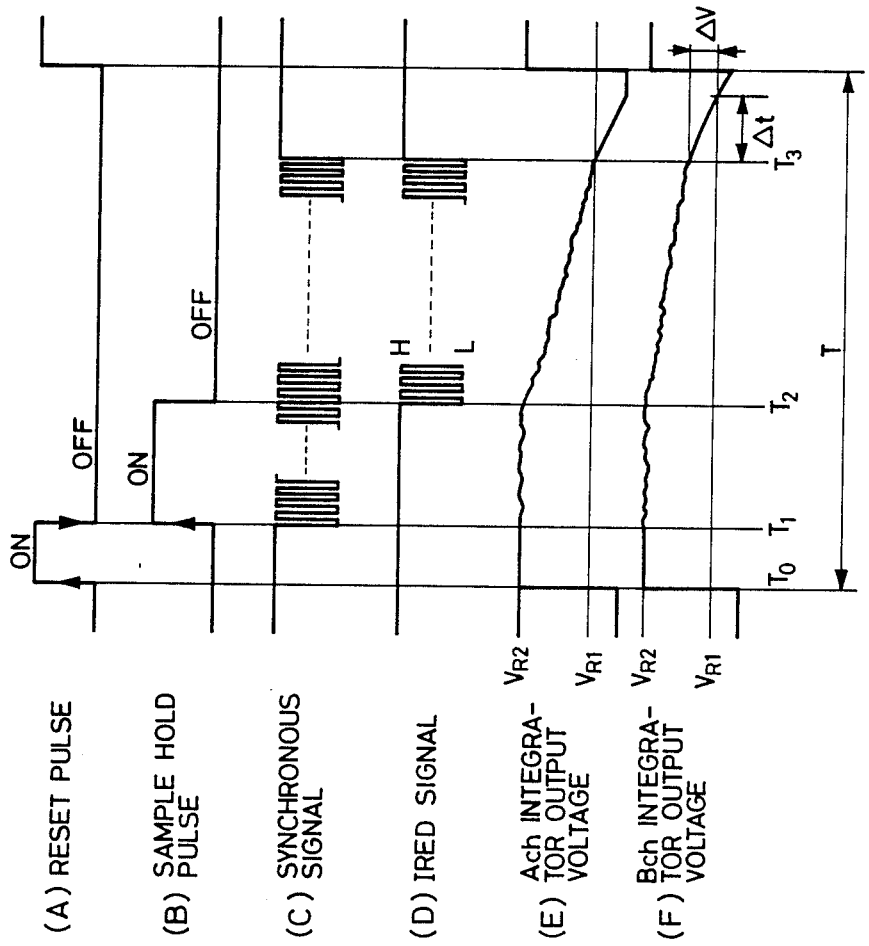
FIG. 2 is a waveform chart of assistance in explaining a mode of operation of the automatic focusing apparatus of FIG. 1.

FIG. 2 is a time chart showing principal signals transmitted between the essential components of the automatic focusing apparatus of FIG. 1.

The reset pulse generator 19 provides a reset pulse (A) at time $T_0$. Then, the integrators 6 and 7 are reset forcibly, so that a reset voltage $V_{R2}$ appears at the outputs of the integrators 6 and 7. The reset pulse (A) falls at time $T_1$, namely, a moment a sufficient time for the output voltages of the integrators 6a and 7 reach the reset voltage $V_{R2}$ after the time $T_0$, and, at the same time, the SH pulse generator 18 provides a SH pulse (B). At the time $T_0$, the synchronizing signal generator 17 starts generating a synchronizing signal (C). At the time $T_0$, the light emission diode 51 is not lighted and hence only the background light falls on the PDs 1a and 1b. Consequently, the DC components of the outputs of the synchronous detectors 4 and 5 are only the offset voltages The integral voltages of the offset voltages are applied through the amplifiers 10 and 11 and the sample-hold circuits 12a and 13, which become conductive only while the SH pulse (B) is on, to the negative input terminals of the differential amplifiers 15 and 16, respectively, while the reset voltage $V_{R2}$ is applied to the positive input terminals of the differential amplifiers 15 and 16. The respective output voltages of the differential amplifiers 15 and 16 are proportional to the difference between the output of the integrator 6 and the reset voltage $V_{R2}$ and to that between the output of the integrator 7 and the reset voltage $V_{R2}$, respectively. The output voltages of the differential amplifiers 15 and 16 are applied to the offset voltage input terminals of the synchronous detectors 4 and 5, respectively, to make the negative feedback loop effective while the SH pulse (B) is on. The outputs of the integrators 6 and 7 are maintained at the reference voltage, namely, the reset voltage $V_{R2}$. The negative feedback loop is equilibrated after the passage of a sufficient time in a period where the SH pulse (B) is on. At the trailing edge of the SH pulse (B), the sample-hold circuits 12 and 13 changes from a conductive state to a voltage holding state. Consequently, a voltage canceling the offset voltages of the system is applied to the synchronous detectors 4 and 5 and thereby voltages provided by integrating only voltages proportional to the amplitude of the focusing signals with respect to time appear at the output terminals of the integrators 6 and 7.

In the waveform chart of FIG. 2, the output voltage (E) of the integrator 6 (channel A) reaches the reference voltage $V_{R1}$ before the output voltage (F) of the integrator 7 (channel B). Upon the arrival of the integral output voltage of the channel A at the reference voltage $V_{R1}$ at time $T_3$, the integrator 6 starts a predetermined fixed integral control action regardless of the magnitude of the input signal. Suppose that the gradient of an integral voltage during the fixed integral control action is K (v/s). Then, the relation between a time $\Delta t$ required for the integral output voltage (F) of the channel B to reach the reference voltage $V_{R1}$ after the time $T_3$, and the voltage difference $\Delta V$ between the respective integral output voltages (E) and (F) of the channels A and B at the time $T_3$ is expressed by expression: $\Delta V = K \cdot \Delta t$. The value $\Delta V$ is dependent on the ratio of quantity of incident light between the two PDs 1a and 1b and is reduced substantially to zero when the video camera is brought into focus. This embodiment evaluates the time $\Delta t$ instead of the voltage difference $\Delta V$ by the focus decision circuit 56 to decide the focusing state. It is decided that the video camera is in focus when the time $\Delta t$ is smaller than a fixed value, and it is decided that the video camera is out of focus when the same is greater than the fixed value. When the video camera is in focus, the motor 57 for driving the range ring is stopped while the motor 57 is driven for rotation in a direction to reduce the time $\Delta t$ for the focusing operation when the video camera is out of focus.

Figure 3:
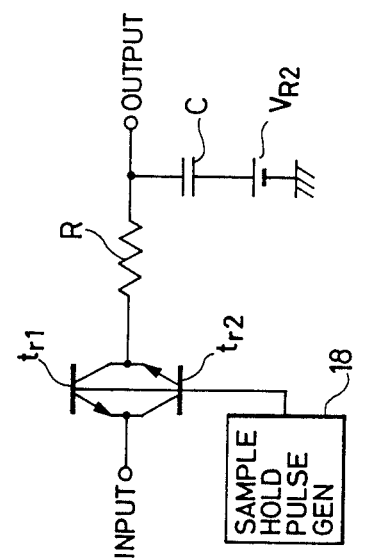
FIG. 3 is a circuit diagram of a sample-hold circuit incorporated into the automatic focusing apparatus of FIG. 1.

FIG. 3 shows the constitution of the sample-hold circuits 12 and 13 of the first embodiment. When the output (B) of the SH pulse generator 18 becomes on, transistors $tr_1$ and $tr_2$ become conductive and thereby a voltage applied to an input terminal is transmitted through a resistance R and appears at an output terminal. The grounding terminal of a capacitor C is grounded through a power source having the same voltage as the reset voltage $V_{R2}$ for resetting the integrators 6 and 7. When the power source is turned on, the voltage of the output terminal of the capacitor C reaches the voltage $V_{R2}$ immediately, and thereby a time required for the negative feedback loop to be equilibrated is reduced.

In this embodiment, the performance of the automatic focusing apparatus is improved further by generating the reset pulse (A) at the trailing edge of the SH pulse (B). Such a mode of automatic focusing operation will be described with reference to FIG. 4.

At the trailing edge of a SH pulse (b), the infrared emission diode 51 starts emitting infrared rays. If the object is located near the video camera, intensity of the reflected light is very high and hence the gains of the preamplifiers 2 and 3 need to be reduced. The gains of the preamplifiers 2 and 3 are controlled automatically by an AGC (automatic gain control) circuit. However, since the AGC circuit needs a fixed time for effective gain control operation, the integrators 6 and 7 are reset to interrupt integration forcibly during the period of operation of the AGC circuit in which the outputs of the preamplifiers 2 and 3 are unstable, and then integration is started at time $T_2'$ when the outputs of the preamplifiers 2 and 3 are stabilized. Accordingly, the automatic focusing apparatus is able to carry out focusing operation stably irrespective of the subject distance.

Figure 5:
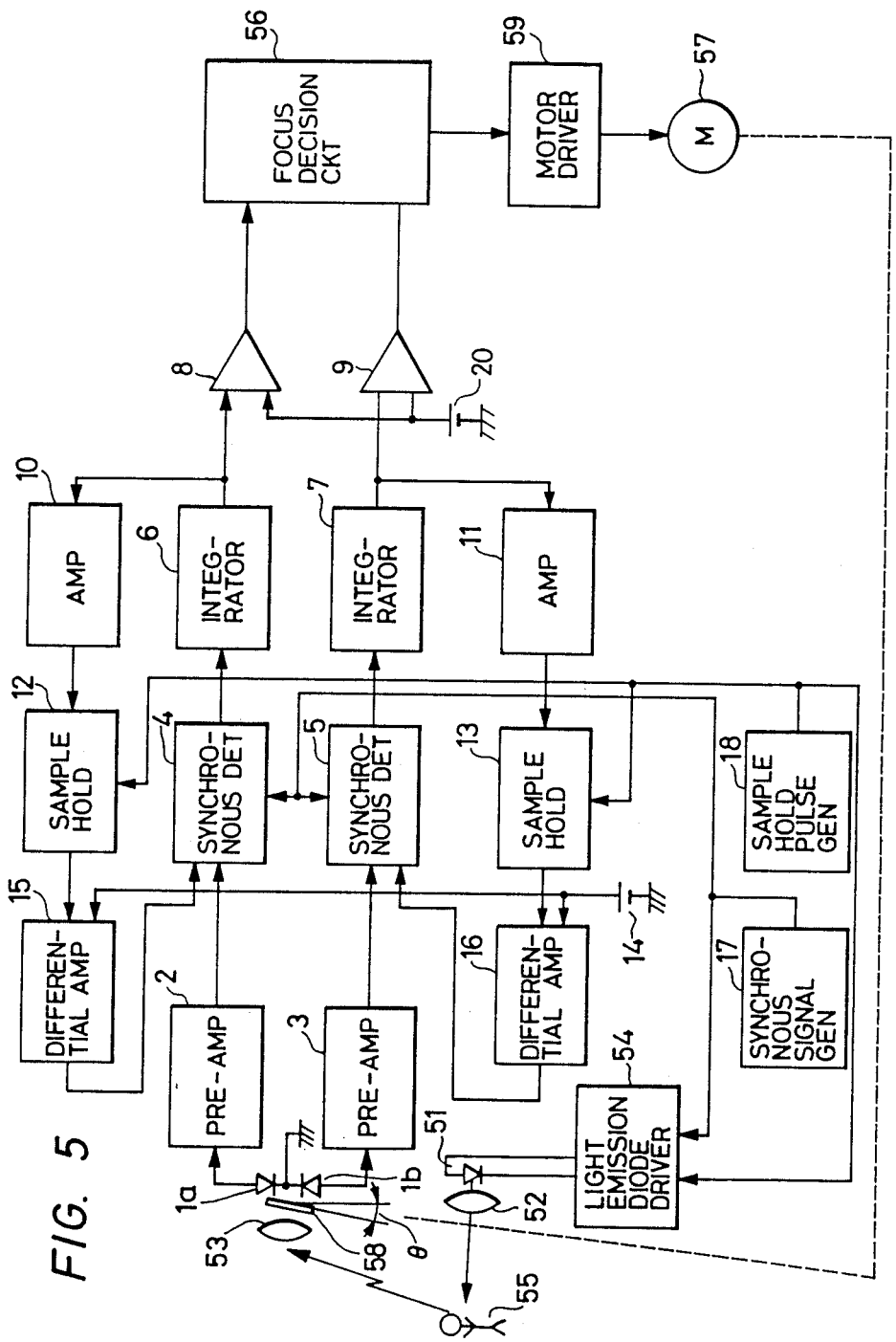
FIGS. 5, 6 and 7 are block diagrams of automatic focusing apparatus, in further embodiments, according to the present invention.

An automatic focusing apparatus, in a second embodiment, according to the present invention will be described hereinafter with reference to FIG. 5. The second embodiment is similar to the first embodiment in construction except that the second embodiment is not provided with a circuit corresponding to the reset pulse generator 19 of the first embodiment. In the second embodiment, a negative feedback loop is formed through the duration of the SH pulse (B) to make the output voltages of integrators 6 and 7 equal to the reset voltage $V_{R2}$. Therefore, the integral voltages provided by the integrators 6 and 7 become equal to the reset voltage $V_{R2}$ in a fixed time without requiring any reset pulse. Since the integral voltages provided by the integrators 6 and 7 are adjusted to the reset voltage $V_{R2}$ only by the agency of the negative feedback loop without resetting the integrators 6 and 7, the duration of the SH pulse (B) in the second embodiment must be longer than that of the SH pulse in the first embodiment. However, such an arrangement of the circuit simplifies the constitution of the integrators 6 and 7.

An automatic focusing apparatus, in a third embodiment, according to the present invention will be described with reference to FIG. 6.

Figure 6:
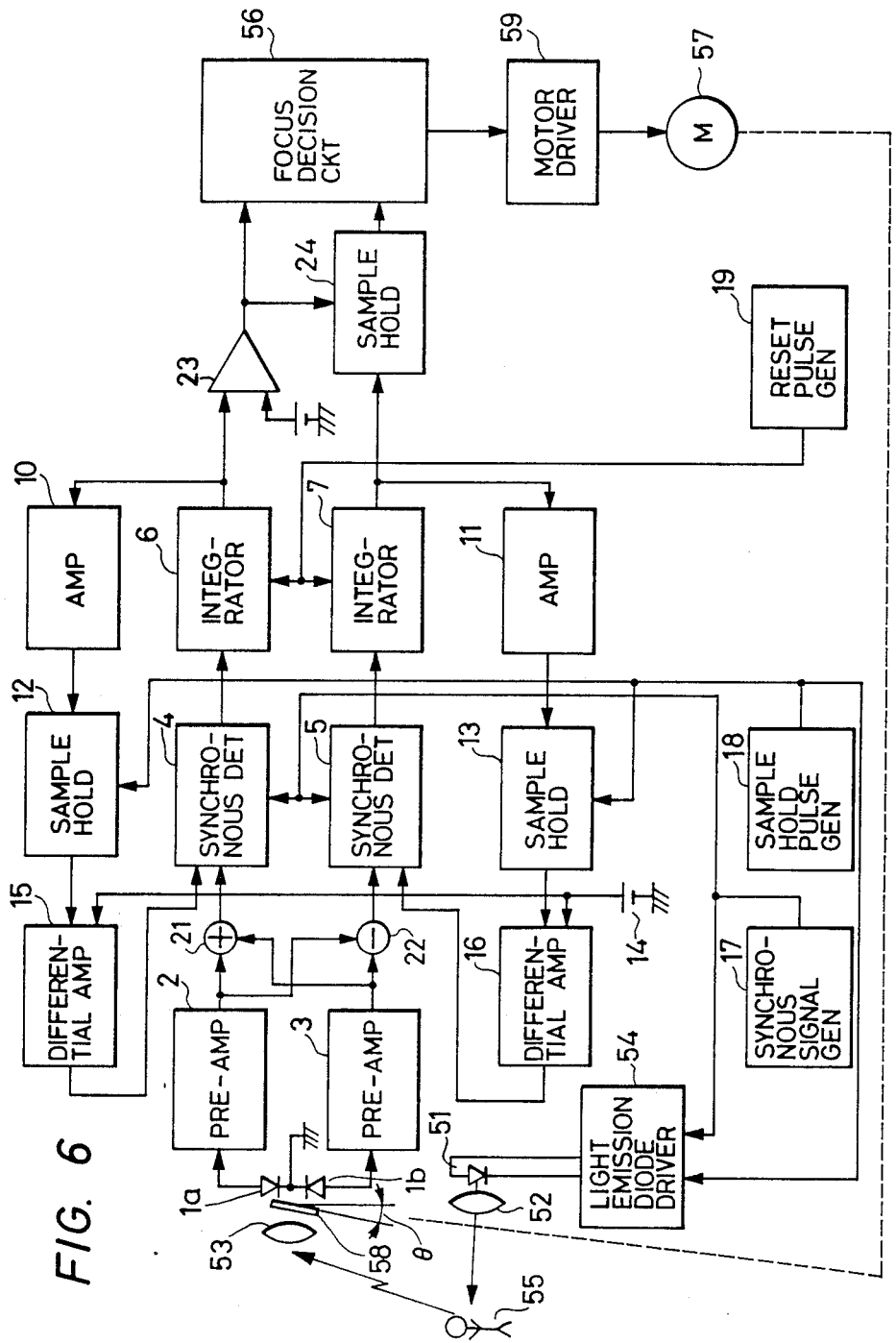

The automatic focusing apparatus shown in FIG. 6 comprises, in addition to the components of the automatic focusing apparatus shown in FIG. 1, an adder 21 for adding the photoelectric output voltages of two channels, a subtracter 22 for calculating the difference between the photoelectric output voltages of the two channels, a comparator 23 for comparing the integral output voltage corresponding to an add signal representing the addition of the photoelectric output voltages of the two channels with a fixed value, and a sample-hold circuit 24 for holding the integral output of a difference signal representing the difference between the photoelectric output voltages of the two channels.

In this automatic focusing apparatus, as in the automatic focusing apparatus of FIG. 1, a negative feedback loop is formed during the duration of the SH pulse (B) and hence integrators 6 and 7 provide integral outputs free of offset voltages. After the SH pulse (B) has fallen, an add signal representing the addition of the photoelectric output voltages of the two channels is given to the integrator 6, and a difference signal representing the difference between the photoelectric output voltages of the two channels is given to the integrator 7. Upon the arrival of the output voltage of the integrator 6 at a fixed value, the comparator 23 gives the SH pulse (B) to the sample-hold circuit 24. Then, the sample-hold circuit 24 holds the integral output voltage of the integrator 7. The integral output voltage held by the sample-hold circuit 24 is evaluated by a focus decision circuit 56 to decide whether or not the video camera is in focus.

An automatic focusing apparatus, in a fourth embodiment, according to the present invention will be described with reference to FIG. 7. This automatic focusing apparatus detects the high-frequency component of a video signal for automatic focusing operation.

Figure 7:
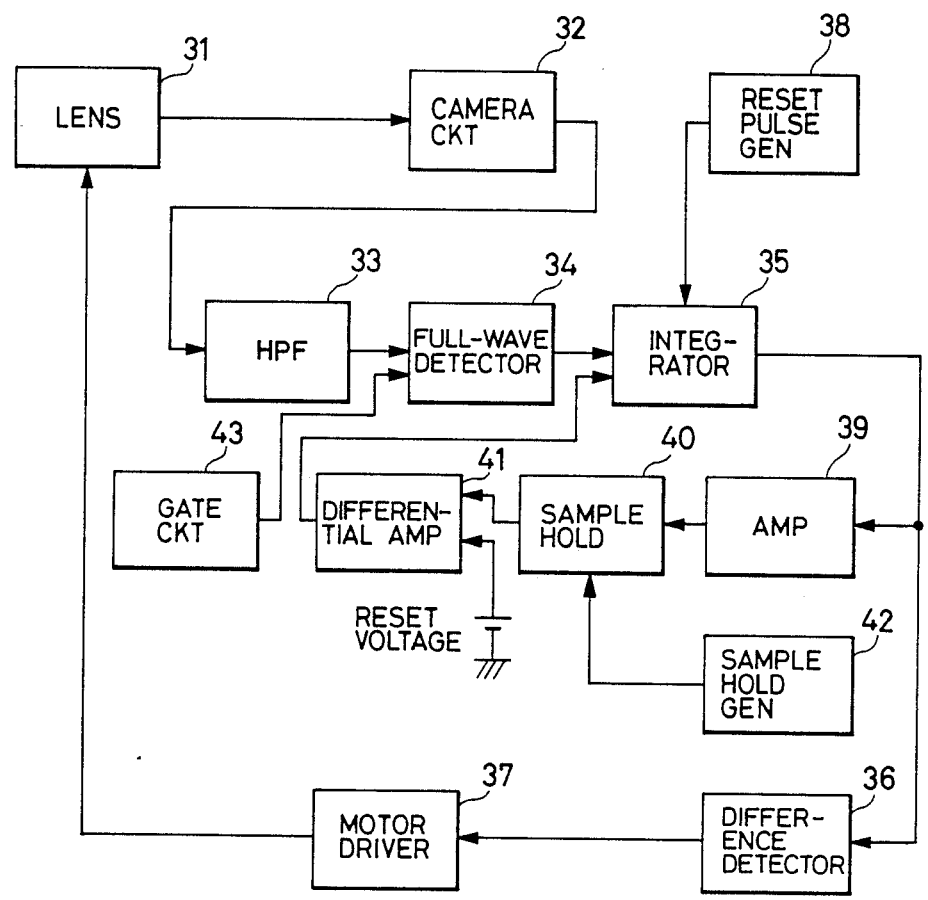

Referring to FIG. 7, the automatic focusing apparatus comprises a taking lens 31, a camera circuit 32, a high-pass filter (hereinafter referred to as "HPF") 33 for extracting the high-frequency component of a video signal, a full-wave detector 34, an integrator 35, a difference detector 36, a motor driver 37 for controlling the range ring of the taking lens 31, a reset pulse generator 38 which generates a reset pulse signal for resetting the integrator 35, an amplifier 39, a sample-hold circuit 40, a differential amplifier 41, a SH pulse generator 42, and a gate circuit 43 which generates a pulse signal to make the full-wave detector active for a period for passing the video signal.

Figure 8:
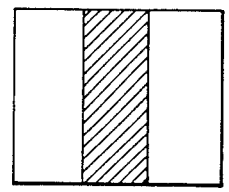
FIG. 8 is an illustration of a screen.
Figure 9:
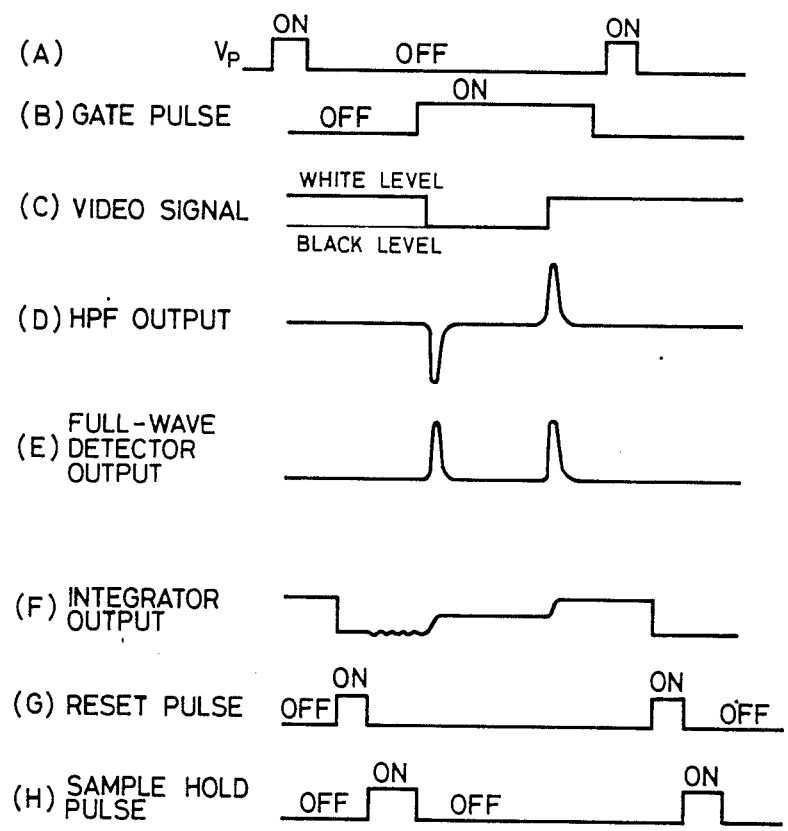
FIG. 9 is a waveform chart of assistance in explaining a mode of operation of the automatic focusing apparatus of FIG. 7.

The mode of operation of the automatic focusing apparatus of FIG. 7 in taking an object as shown in FIG. 8 will be described with reference to a waveform chart shown in FIG. 9. The HPF 33 extracts the high-frequency component of a video signal (C) provided by the camera circuit 32 and gives the high-frequency component to the full-wave detector 34. The gate circuit 43 provides a gate signal which remains in a high state for a fixed period of time to control the full-wave detector 34 so that a HPF output (D) representing the central portion of the screen is extracted. The full-wave detector 34 is active and provides a full-wave detector output (E) only while the gate signal is in a high state. The integrator 35 integrates the full-wave detector output (E) continuously while the gate pulse (B) is in a high state to provide an integrator output (F) proportional to the high-frequency component. The taking lens 31 is driven so that the voltage of the integrator output (F) at the end of the integrating operation reaches a maximum to bring the taking lens 31 in focus. After a pulse of a vertical synchronizing pulse (A) has risen, the reset pulse generator 38 generates a reset pulse (G) to reset the integrator 35. In a period from a moment when the integrator 35 is reset to a moment when the gate pulse (B) is provided, a SH pulse (H) generated by the SH pulse generator 38 remains in a high state. The output voltage of the integrator 35 is applied through the amplifier 39 and the sample-hold circuit 40 to the differential amplifier 41. The differential amplifier 41 compares the output voltage of the integrator 35 with the reset voltage for resetting the integrator 35, and then the output of the differential amplifier 41, namely, the result of the comparison, is given to the integrator 35. Thus, a negative feedback loop is formed. Consequently, the integrator 35 operates to make the integrator output (F) approach the reset voltage without receiving the HPF output (D) while the gate pulse (B) is in a low state. When the negative feedback loop is brought to an equilibrium, the offset voltages of the full-wave detector 34 and the integrator 35 are canceled by the output voltage of the differential amplifier 41. Accordingly, the SH pulse (H) falls and the sample-hold circuit 40 holds the output of the integrator 35 provided when the negative feedback loop is brought to an equilibrium. Since the offset voltages are thus regulated automatically, only the high-frequency component of the video signal (C) is integrated by the full-wave detector 34 and the integrator 35.

Thus, according to the present invention, the regulation of the offset voltage is not necessary because the offset voltage of the integrator is corrected continuously. Furthermore, the feedback regulating system eliminates the adverse influence of the variation of ambient temperature on the focusing accuracy, secures the satisfactory performance and improves the stability of the automatic focusing apparatus.

What is claimed is:

1. An automatic focusing apparatus capable of producing a focusing signal by using the quantity of light reflected by an object, comprising:
   light receiving means for generating photoelectric signals respectively corresponding to the quantities of incident light thereon;
   detector means connected to the light receiving means to provide detection signals by detecting the photoelectric signals respectively provided by the light receiving means;
   integrating means connected to the detector means to integrate the detection signals once every predetermined period;
   focus decision means for producing a focusing signal by processing the output of the integrating means;
   sample-hold means for sampling the output of the integrating means and holding the output of the integrating means for a predetermined time;
   comparing means for comparing the output of the sample-hold means with a reference signal to provide a difference signal; and
   feedback means responsive to the different signal for controlling the output of the integrating means in the sampling period of the sample-hold means so as to reduce the difference signal to zero.

2. An automatic focusing apparatus according to claim 1, wherein the difference signal provided by said comparing means is fed back to the DC signal regulating terminal of said integrating means through said feedback means.

3. An automatic focusing apparatus according to claim 2, wherein the output of said integrating means is set for said reference signal prior to the start of the sampling action of said sample-hold means.

4. An automatic focusing apparatus according to claim 3, wherein the output of said integrating means is set for said reference signal for a predetermined time after the end of the sampling action of said sample-hold means.

5. An automatic focusing apparatus according to claim 3, wherein said reference signal is equal to a reset signal for resetting said integrating means.

6. An automatic focusing apparatus according to claim 1, wherein the difference signal provided by said comparing means is applied to an offset signal input terminal of said detectors means through said feedback means.

7. An automatic focusing apparatus according to claim 6, wherein said integrating means are reset by said reference signal before the start of the sampling action of said sample-hold circuits.

8. An automatic focusing apparatus according to claim 7, wherein said integrating means are reset for said reference signal for a predetermined time after the end of the sampling action of said sample-hold means.

9. An automatic focusing apparatus according to claim 7, wherein said reference signal is equal to the reset signal for resetting said integrating means.

10. An automatic focusing apparatus according to claim 1, wherein said reference signal is equal to the reset signal for resetting said integrating means.

11. An automatic focusing apparatus according to claim 1, wherein said integrating means is set for said reference signal before the start of the sampling action of said sample-hold means.

12. An automatic focusing apparatus according to claim 1, wherein said integrating means are set for said reference signal for a predetermined time after the end of the sampling action of said sample-hold means.

13. An automatic focusing apparatus comprising:
a light projecting unit comprising an light emitting element, and a projecting lens for condensing the light emitted by the light emitting element;
a light receiving unit comprising a light receiving lens for receiving the reflected light, namely, the light projected by the light projecting unit and reflected by an object, therethrough, and first and second light receiving elements which receive the reflected light condensed by said receiving lens and generate photoelectric signals corresponding to the quantities of the reflected light falling thereon, respectively;
receiving lens driving means for driving the receiving lens;
a first synchronous detector which receives the photoelectric signal provided by the first light receiving element and provides a first detection signal through the synchronous detection of the photoelectric signal in synchronism with a pulse signal for driving the light emitting element;
a second synchronous detector which receives the photoelectric signal provided by the second light receiving element and provides a second detection signal through the synchronous detection of the photoelectric signal in synchronism with the pulse signal for driving the light emitting element;
a first integrating means connected to the first synchronous detector to integrate the detection signal provided by the first synchronous detector;
a second integrating means connected to the second synchronous detector to integrate the detection signal provided by the second synchronous detector;

a reset pulse generating means which applies a reset pulse signal to the first and second integrating means; and
focus decision means which generates a focus decision signal on the basis of the output signals of the first and second integrating means and gives a driving signal to driving means for driving the receiving lens;
characterized in the further provision of
a first sample-hold circuit which samples and holds the integral output of the first integrating means;
a second sample-hold circuit which samples and holds the integral output of the second integrating means;
a first differential amplifier which compares a voltage held by the first sample-hold circuit with a reference voltage and applies a signal representing the result of comparison to the offset voltage terminal of the first synchronous detector; and
a second differential amplifier which compares a voltage held by the second sample-hold circuit with the reference voltage and applies a signal representing the result of comparison to the offset voltage terminal of the second synchronous detector.

14. An automatic focusing apparatus according to claim 13, wherein an add signal representing the addition of the photoelectric signals provided by said first and second light receiving elements is given to said first synchronous detector, and a difference signal representing the difference between the photoelectric signals provided by said first and second light receiving elements is given to said second synchronous detector.

15. An automatic focusing apparatus comprising:
a light projecting unit comprising a light emitting element, and a projecting lens for condensing the light emitted by the light emitting element;
a light receiving unit comprising a receiving lens for receiving the reflected light, namely, the light projected by the light projecting unit and reflected by an object, therethrough, and light receiving elements which receive the reflected light condensed by the receiving lens and generates photoelectric signals respectively corresponding to the quantities of the reflected light falling thereon;
receiving lens driving means for driving the receiving lens;
synchronous detectors respectively connected to the light receiving elements to provide detection signals through the synchronous detection of the photoelectric signals in synchronism with a pulse signal for driving the light emitting element, respectively; and
integrating means respectively connected to the synchronous detectors to integrate the respective detection signals provided by the synchronous detectors; focus decision means which generates a focus decision signal on the basis of the output signals of the integrating means and gives a driving signal to the receiving lens driving means;
characterized in the further provision of sample-hold circuits which respectively sample and hold the integral outputs of the integrating means; and
differential amplifiers which respectively compare voltages supplied from the sample-hold circuits with a reference voltage and apply signals representing the result of comparison to the offset voltage terminals of the synchronous detectors, respectively.

16. An automatic focusing apparatus capable of producing a focusing signal on the basis of the high-frequency components of a video signal provided by a video camera, comprising:

a full-wave detector which receives the high-frequency component of the video signal;

an integrator connected to the output terminal of the full-wave detector;

a sample-hold circuit connected to the output terminal of the integrator; and comparing means which compares the output of the sample-hold circuit with a reference voltage and gives a signal representing the result of the comparison to the DC voltage regulating terminal of the integrator.

17. An automatic focusing apparatus according to claim 16, wherein said integrator is set for the reference voltage before the start of the sampling action of said sample-hold circuit.

18. An automatic focusing apparatus according to claim 16, wherein said integrator is set for the reference voltage for a predetermined time after the end of the sampling action of said sample-hold circuit.

19. An automatic focusing apparatus according to claim 17, wherein said reference voltage is equal to a voltage for resetting said integrating means.

20. An automatic focusing apparatus according to claim 16, wherein said video signal is gated at regular intervals, and said sample-hold circuit samples and holds the outputs of said integrator provided in periods in which said video signal is not given to said integrator.

21. An automatic focusing apparatus comprising:

integrating means responsive to photoelectric signals for integrating the photoelectric signals once every predetermined period;

sample-hold circuit means for receiving the integral outputs of the integrating means and for holding the integral outputs of the integrating means for a predetermined time and providing output signals indicative thereof;

comparing means for comparing the output signals of the sample-hold circuit means with a reference signal to provide a comparison signal thereof;

means for controlling the integrating means in accordance with the comparison signal; and focusing means responsive to the output of the integrating means for enabling focusing.

22. An automatic focusing apparatus according to claim 21, wherein the comparing means provides a difference signal as the comparison signal, and the means for controlling the integrating means includes feedback means for controlling the output of the integrating means in the sampling period of the sample-hold circuit means to reduce the difference signal provided by the comparing means to zero.

23. An automatic focusing apparatus according to claim 22, further comprising means for generating the photoelectric signals, the photoelectric signal generating means including light receiving means.

24. An automatic focusing apparatus according to claim 23, wherein the light receiving means comprises one of a video camera and light receiving elements.

* * * * *